July 19, 1966   J. B. ULAM   3,261,724
STAINLESS STEEL CLAD ALUMINUM AND METHODS OF MAKING SAME
Filed June 28, 1965
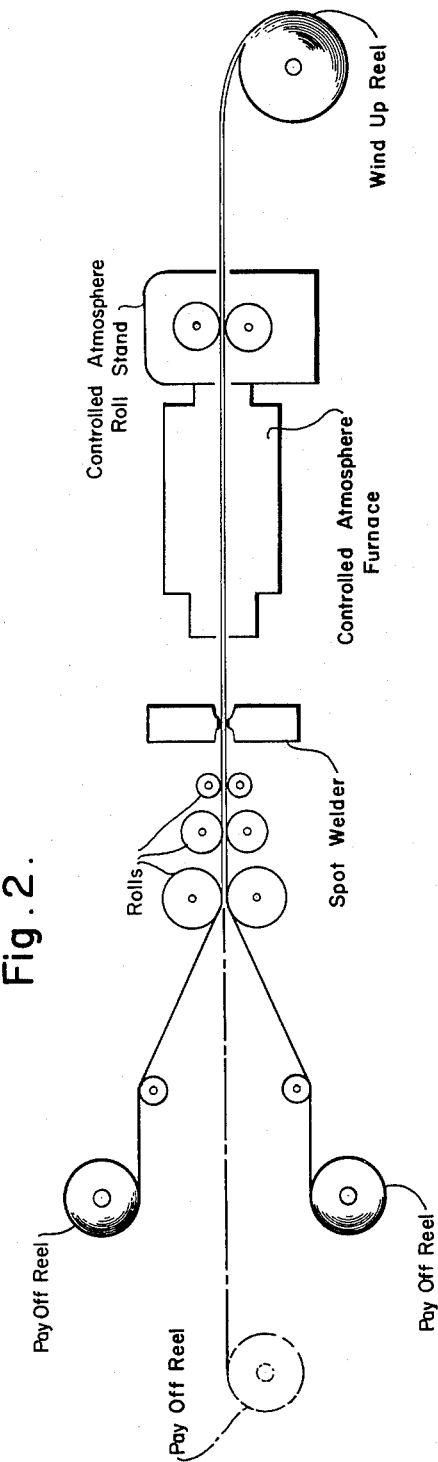
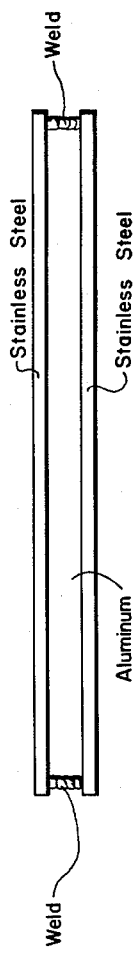
INVENTOR
John B. Ulam 3,261,724
STAINLESS STEEL CLAD ALUMINUM AND
METHODS OF MAKING SAME
John B. Ulam, Canonsburg, Pa., assignor to Composite Metal Products, Inc., a corporation of Pennsylvania
Filed June 28, 1965, Ser. No. 467,548
10 Claims. (Cl. 148—11.5)

This invention relates to stainless steel clad aluminum and to methods of making stainless steel clad aluminum and is a continuation-in-part of my copending application Serial No. 130,181, filed August 8, 1961, now Patent No. 3,210,840.

The manufacture of clad metals is not new. There have been many processes developed for the cladding of a variety of metals with other dissimilar metals. For example, my Patents No. 2,718,690 and No. 2,758,368 relate generally to methods of cladding one metal with a dissimilar metal. The problems of cladding aluminum with stainless steel have, however, remained unsolved due in large measure to the dissimilarities between aluminum and stainless steel and particularly to the considerable differences in hardening qualities and oxidation rates.

Stainless steel clad aluminum is highly desirable for a variety of services where lightweight corrosion resistant metals having a tough skin is desired. For example, such materials are highly desirable for cooking ware or aircraft and missile applications and the like.

As I have already stated, the great difference in melting points, the rapid recovery of oxide production on the surfaces and the vast spread in the mechanical and physical characteristics of aluminum and stainless steel has virtually blocked the production of such a composite metal.

I have found that such a stainless steel clad aluminum may be produced provided certain conditions are observed and carried out throughout the processes.

I have found that solders, fluxes or brazing materials do not produce a satisfactory clad metal and that poor bond strength and complete lack of formability results when any metal additives are used at the bond unless the particular method of the present application is followed. Such materials, I have found, are not essential and are generally undesirable for the reason that they appear to diffuse into the aluminum or stainless to too great a degree creating a brittle bond. I have found that too much diffusion in the case of stainless clad aluminum is the source of many of the problems of the past. My practice is intended to and does produce a controlled diffusion at the bond.

Preferably, I provide a method of cladding aluminum and aluminum alloys with stainless steel which comprises providing an outer layer of substantially pure aluminum on said aluminum or aluminum alloy removing by mechanical treatment substantially all oxide from the surfaces of the outer layer of aluminum and stainless steel to be bonded, heating the metal surfaces to a temperature above the recrystallization temperature of aluminum but below the melting point of aluminum and below the recrystallization temperature of the stainless steel, bringing the cleaned surfaces into contact with one another under pressure sufficient to effect a simultaneous reduction up to 35% in each of the metals, urging them together to unite the surfaces into a diffusion bond and thereafter annealing at a temperature of about 700° F. to 900° F. The practice of my invention can perhaps be best understood by reference to the following example.

EXAMPLE

Two pieces of aluminum clad aluminum (1145 aluminum clad on the surfaces of 3003 aluminum alloy) 0.125" x 24" x 60" in the annealed condition and one or two pieces of austenitic stainless steel 0.010" x 23" x 58", are mechanically cleaned to remove all oxides and expose the pure crystalline or lattice structure on one side only of each of the components. I then place one aluminum or aluminum alloy piece with the cleaned surface facing upward and then place one stainless layer on top with its cleaned surface down, facing the clean face of the aluminum. The second piece of mechanically cleaned stainless is placed on top of the other stainless cladding with its mechanically cleaned face upward. I then place the second mechanically cleaned aluminum sheet with its cleaned face downward in contact with the cleaned surface of the stainless steel. I then resistance or torch weld the ends of the stack together to hold the components in place. The pack is then heated to at least the recrystallization temperature of aluminum (650° to 1100° F.) in a vacuum or in an inert atmosphere previously described, then rolled to a 25 percent reduction to produce a 0.101" thick composite. Additional rolling passes or pressure is not required but may be used when rolling packs or single assemblies. The cleaned stacked components are reduced only from 5% to 35% and preferably 10 to 35% to obtain the bond. The reduction may be by rolling, forging, pressing or other metal forming technique. Greater reduction during the application of pressure effects considerable work hardening into the stainless steel component. Since all hot work in the manufacture of a composite of stainless steel and aluminum is accomplished below the recrystallization temperature of the stainless steel, it then is subjected to one of its inherent characteristics which is work hardening. To produce composite product capable of being further fabricated, such as by deep drawing, the hardening characteristic must be kept to a minimum. I have found that a reduction of 35 percent should not be exceeded unless the composite is to be used for structural applications.

The formed composite is next annealed from two minutes to fifteen minutes at 700° F. to 900° F. The resulting annealed composite was more readily formed, and the bond strength was much higher than the original unannealed composite.

FIGURE 1 illustrates a pack made in this manner. However, it should be noted that it is not necessary to make a 3-ply assembly for manufacturing of the product; a 2-ply pack may suffice. Tack or spot welds join the edges of the stainless steel which overhangs the aluminum by approximately the diameter of the spot weld. If the stainless steel and aluminum are of the same external dimensions tack welds can be used on the sides and ends to stabilize the pack for proper handling.

The importance of the pack construction, exact heating temperature and rolling pressure cannot be stressed too much in my process.

FIGURE 2 illustrates the continuous rolling of stainless steel clad aluminum either single or double armor. Another example of my invention is the use of coils of stainless steel and aluminum to manufacture coils of the composite metal. Coils of stainless steel are subjected to cleaning by either mechanically removing the surface to expose the pure cleaned molecular grain or lattice structure or by cleaning that would result from mechanically reducing the stainless steel and then cleaning by annealing in an inert atmosphere or by normal cleaning practices of the steel industry. The aluminum is mechanically cleaned by any of the methods described and then brought into contact with the cleaned stainless steel, heated in one or separate furnaces to a temperature at least that required to recrystallize the aluminum and then subjecting the components to 10 to 35 percent reduction by applying pressure such as by rolling, pressing, forging, etc.

The coils of stainless steel and aluminum are either precleaned or cleaned in the cladding process to remove all contaminates and oxides and expose the completely pure molecular or lattice surface ready for heating and bonding. The two, three, or four strands or coils of stainless steel and aluminum are brought into intimate contact after the thorough cleaning operation by pinch rolls and if necessary the components are spot welded together to hold them in aligned relation during heating in a vacuum, or inert atmosphere to retain their oxide free surface prior to application of pressure. The coils of stainless steel and aluminum are fed into either separate or the same furnace by driven pinch rolls where the strands are heated between 650° to 1100° F. While maintaining the completely cleaned molecular surface during heating and subsequent pressure application for bonding. The heated components with their mechanically cleaned surfaces are reduced 10 to 35 percent by pressure such as by rolling or forging, uniting their mechanically clean surfaces to form the single or double clad composite. The reduction of the composite should preferably be carried out in a single heating with a minimum number of passes. In the case of a 4-ply assembly or coil the edges are trimmed and separated. No separating compound is needed to keep the stainless steel cladding from bonding because of the tenuous oxide of the stainless steel surface, which was not cleaned mechanically. Diffusion of the stainless into the other cladding of stainless will not occur at such low temperatures.

The same practice has been followed using aluminum alloys and stainless steel in the ferritic and in the martensitic state. I have used aluminum and aluminum alloys in both the annealed or cold worked state with equal success. Preferably, I clean the surfaces of both the aluminum and the stainless by a wire brushing or abrasive belt operation. However, the cleaning operation may be accomplished by any operation which will remove all of the oxides of the surfaces particularly of the aluminum which are to be bonded. This cleaning must be accomplished without imparting any grit, abrasive or chips so that a perfectly clean, oxide-free surface is provided. This is necessary in order to expose the pure, clean molecular, grain or lattice structure of the metal.

As will be seen from the foregoing example, the cleaned surfaces are immediately bonded together and subjected to a high degree of vacuum or a non-oxidizing or inert atmosphere such as argon, helium, hydrogen, nitrogen, lithium or the like, prior to and during the heating and pressure treating steps. The cleaned aluminum and stainless in contact with one another in the desired vacuum or non-oxidizing atmosphere are heated to a temperature at least as high as the recrystallization temperature of the aluminum but below the melting point of the aluminum and below the recrystallization temperature of the stainless steel and are then subjected to rolling, forging, pressing or any other metal forming operation such as explosives or atmospheric pressures.

I have found that the cleaned surfaces of the aluminum and stainless should preferably be brought together and into intimate contact prior to heating. This can be accomplished by cold rolling or cold pressing the materials together prior to heating. If a sufficient intimate contact is achieved, a condition equivalent to a vacuum is created between the sheets and no evacuation or inert atmosphere is necessary at the heating step. The cold pressing operation creating its own non-oxidizing condition.

By properly cleaning the surfaces to remove the oxidized surface layer to expose new pure and clean grain or lattice structure and by heating and applying pressure to the metals at the temperatures set out hereinabove, and then annealing for 2 to 15 minutes at 700° F. to 900° F., it is possible to achieve a high strength bond which is free of a brittle non-ductile bond line and a higher degree of formability than any previous composite of stainless to aluminum.

I have found that I can increase the bond strength by annealing the stainless clad product after having produced the product following the rolling step. I then take the as-bonded product and subject it to an annealing operation at a temperature ranging from 700° F. to 900° F. for 2 to 15 minutes. The bond strength is increased proportionately resulting in a product that consistently can be formed and fabricated into end applications. The annealing operation need not be an extended period of time but only long enough to soften the aluminum.

The aluminum core or cladding should have claddings of pure aluminum on one or both sides which must be placed against the stainless steel. By pure aluminum, I mean an alloy that contains 99% aluminum or greater. It has been found that aluminum should consist of at least 99.3% of the analysis, the remaining residual elements will be silicon, iron, copper, manganese, zinc, chromium, titanium and other trace elements.

I have found when elements such as magnesium or manganese exceed .5% each, I cannot increase the bond strength by annealing for a short time element.

I have found also that pure aluminum will diffuse more rapidly and create a higher strength bond when annealing at the above temperature range than any other existing alloys. The solubility of aluminum into stainless steel is very low, however, the diffusion process takes place during the heating of the product to a temperature between 700° F. to 900° F. whereas, the alloys of aluminum which contain manganese or magnesium do not diffuse as rapidly. Evidently the pure aluminum particles resist or are bound from diffusion or flow by these elements, therefore, only a pure aluminum or a pure aluminum faced aluminum can be used to take advantage of the annealing step.

In a preferred practice I use a material called Alclad aluminum material for the bonding operation to stainless steel. The metal consists of pure aluminum cladded to an aluminum alloy, in commercial terms 1145 aluminum clad to 3003 or 3004 aluminum. Again, when bonding directly to the 3003 or 3004, I find that the bond will not grow in strength and maintains its normal level. I have found that the clad product with the pure aluminum facing next to the stainless steel would diffuse rapidly when annealed within the above temperature range.

I have also found that the cladding of pure aluminum should be at least 3% of the total thickness upon one or both sides and should be free of grease and must be mechanically cleaned to permit bonding. I have taken this material in the as-chemically-cleaned and as-rolled condition and have been unable to obtain a union or bond between its surface and stainless steel with or without the annealing step. The following Table I shows values of bond strength in shear of material made according to this invention.

Table I
BOND SHEAR STRENGTH

| Stainless | Aluminum Base | Aluminum Cladding | Condition | Shear Strength (p.s.i.) | Annealing Temperature, deg. |
|---|---|---|---|---|---|
| 304 One Side | Type 3003 | Type 1145 [1] | As Rolled | [5] 14,150 | |
| Do | do | do | Annealed | [4] 16,250 | 775 |
| Do | Type 5005 | do | do | 14,750 | 750 |
| Do | Type 3003 | Type None [3] | As rolled | 9,125 | |
| Do | Type 3004 | do | Annealed | [6] 11,250 | 750 |
| Do | Type 3003 | Type 1145 | do | 17,100 | 800 |
| 305 One Side | Type 3003 | Type None | As Rolled | [7] 7,950 | |
| Do | do | Type 1230 [2] | do | 12,250 | |
| 302 One Side | do | Type 1145 | Annealed | 14,000 | 800 |
| Do | Type 3004 | do | As Rolled | 6,000 | |
| Do | Type 3003 | Type None | do | 11,250 | |
| 430 One Side | do | Type 1145 | Annealed | 16,700 | 825 |
| 304 Both Sides | do | do | As Rolled | 13,100 | |
| Do | Type 3004 | do | do | 8,200 | |
| Do | Type 3003 | Type None | Annealed | 15,200 | 810 |
| Do | Type 5005 | Type 1145 | As Rolled | 10,300 | |
| Do | Type 3004 | Type None | Annealed | 16,100 | 850 |
| 305 Both Sides | Type 3003 | Type 1145 | do | 11,150 | 775 |
| Do | do | Type None | do | 17,100 | 800 |
| 302 Both Sides | do | Type 1145 | As Rolled | 12,300 | |
| Do | Type 3004 | do | do | 10,200 | |
| Do | Type 3003 | Type None | Annealed | 9,700 | 800 |
| 430 Both Sides | do | do | | | |

[1] Type 1145 Aluminum, 99.5% Aluminum.
[2] Type 1230 Aluminum, 99.3% Aluminum.
[3] No cladding used on base metal.
[4] Pure aluminum cladding, annealed at temperature stated.
[5] Pure aluminum cladding, as rolled, not annealed.
[6] No claddings on base metal, annealed at temperature stated.
[7] No claddings on base metal, as rolled.

In the foregoing description, I have set out a preferred practice and product of my invention. It will, however, be understood that this invention may be otherwise embodied within the scope of the following claims.

I claim:

1. The method of cladding aluminum and aluminum alloys with stainless steel which comprises providing an outer layer of substantially pure aluminum on said aluminum and aluminum alloy removing by mechanical treatment substantially all oxide from the surfaces of the outer layer of aluminum and stainless steel to be bonded, heating the metal surfaces to a temperature above the recrystallization temperature of aluminum but below the melting point of aluminum and below the recrystallization temperature of the stainless steel, bringing the cleaned surfaces into contact with one another under pressure sufficient to effect a simultaneous reduction of 5% to 35% in each of the metals, urging them together to unite the surfaces into a diffusion bond and thereafter annealing at a temperature of about 700° F. to 900° F.

2. The method of cladding aluminum and aluminum alloys with stainless steel which comprises providing an outer layer of substantially pure aluminum on said aluminum and aluminum alloy removing by mechanical treatment substantially all oxide from the surfaces of the outer layer of aluminum and stainless steel which are to be bonded, heating the metal surfaces under nonoxidizing conditions to a temperature above the recrystallization temperature of aluminum but below the melting point of aluminum and below the recrystallization temperature of the stainless steel, and bringing the cleaned surfaces into contact with one another, and applying pressure sufficient to effect a simultaneous reduction of 5% to 35% in each of the metals, urging them together to unite the surfaces into a diffusion bond, and thereafter annealing at a temperature of about 700° F. to 900° F.

3. The method of cladding aluminum and aluminum alloys with stainless steel which comprises providing an outer layer of substantially pure aluminum on the outer surface of the aluminum and aluminum alloy removing by mechanical treatment substantially all oxide from the surfaces of the outer layer of aluminum and stainless steel which are to be bonded, heating the metal surfaces in an inert atmosphere to a temperature above the recrystallization temperature of aluminum but below the melting point of aluminum and below the recrystallization temperature of the stainless steel, bringing the cleaned surfaces into contact with one another, applying pressure sufficient to effect a simultaneous reduction of 5% to 35% in each of the metals, urging them together to unite the surfaces into a diffusion bond, and thereafter annealing at a temperature of about 700° F. to 900° F.

4. The method of cladding aluminum and aluminum alloys with stainless steel which comprises providing an outer layer of at least 99% pure aluminum on the outer surface of the aluminum and aluminum alloy removing by mechanical treatment substantially all oxide from the surfaces of the outer layer of aluminum and stainless steel to be bonded, heating the metal surfaces to a temperature between approximately 650° F. and 1100° F., bringing the cleaned surfaces into contact with one another, applying pressure sufficient to effect a simultaneous reduction of 5% to 35% in each of the metals urging them together to unite the surfaces into a diffusion bond, and thereafter annealing at a temperature of about 700° F. to 900° F. for 2 to 15 minutes.

5. The method of cladding aluminum and aluminum alloys with stainless steel which comprises providing an outer layer of at least 99% pure aluminum containing not more than 0.5% of either manganese and magnesium on the outer surfaces of the aluminum and aluminum alloy removing by mechanical treatment all oxide from the surfaces of the outer layer of aluminum and stainless steel to be bonded, bringing the cleaned surfaces into contact with one another, heating the metal surfaces to a temperature above the recrystallization temperature of aluminum but below the melting point of aluminum and below the recrystallization temperature of the stainless steel, applying sufficient pressure simultaneously to effect a substantially equal reduction in the stainless steel and aluminum to unite the surfaces in a diffusion bond, and thereafter annealing at a temperature of about 700° F. to 900° F.

6. A method as claimed in claim 1 wherein the simultaneous reduction is approximately 10% to 35%.

7. A method as claimed in claim 2 wherein the non-oxidizing condition is a vacuum.

8. A method as claimed in claim 1 wherein the mechanical treatment is wire brushing of the surfaces of the aluminum and stainless steel.

9. A method as claimed in claim 2, wherein the non-oxidizing condition is a reducing atmosphere.

10. A method as claimed in claim 1 wherein the mechanical treatment is abrading of the surfaces of the aluminum and stainless steel.

References Cited by the Examiner

UNITED STATES PATENTS

| | | | |
|---|---|---|---|
| 2,834,102 | 5/1958 | Pflumm et al. | 29—497.5 |
| 2,908,073 | 10/1959 | Dulin | 29—196.2 |
| 3,078,563 | 2/1963 | Gould et al. | 29—497.5 |

DAVID L. RECK, *Primary Examiner.*

H. SAITO, *Assistant Examiner.*